United States Patent
Francis et al.

[11] Patent Number: 5,086,860
[45] Date of Patent: Feb. 11, 1992

[54] VEHICULAR BATTERY RETAINER AND SHIELD

[75] Inventors: Laurie A. Francis, Bloomfield Hills; Richard H. Krentz, Farmington Hills, both of Mich.

[73] Assignee: Saturn Corporation, Troy, Mich.

[21] Appl. No.: 532,769

[22] Filed: Jun. 4, 1990

[51] Int. Cl.$^5$ .................................. B60R 16/04
[52] U.S. Cl. ........................... 180/68.5; 248/503
[58] Field of Search .............. 180/68.5; 248/503, 505, 248/507, 508, 510; 224/42.38, 42.39, 902

[56] References Cited

U.S. PATENT DOCUMENTS

| | | | |
|---|---|---|---|
| 602,302 | 4/1898 | Brougham et al. | 280/68.5 |
| 929,118 | 7/1909 | Buckwalter | 280/68.5 |
| 1,338,690 | 5/1920 | Moorman | 180/68.5 |
| 1,359,446 | 11/1920 | Stephens et al. | 280/68.5 |
| 1,459,973 | 6/1923 | Colgan | 280/68.5 |
| 1,591,940 | 7/1926 | Joyce | 280/68.5 |
| 2,035,066 | 3/1936 | Havas | 280/68.5 |
| 3,834,479 | 9/1974 | Bowers et al. | 180/68.5 |
| 3,866,704 | 2/1975 | Bowers et al. | 180/68.5 |
| 4,327,809 | 5/1982 | Fenstermaker | 180/68.5 |
| 4,367,572 | 1/1983 | Zielenski | 24/301 |
| 4,506,748 | 3/1985 | Thomas | 180/68.5 |
| 4,520,887 | 6/1985 | DiFazio | 180/68.5 |
| 4,538,697 | 9/1985 | Muroi et al. | 180/68.5 |
| 4,556,187 | 12/1985 | McLin | 248/503 |
| 4,682,751 | 7/1987 | Tamas | 248/503 |
| 4,723,618 | 2/1988 | Coonradt | 180/68.5 |

Primary Examiner—Andres Kashnikow
Assistant Examiner—Richard Camby
Attorney, Agent, or Firm—Lawrence B. Plant

[57] ABSTRACT

A motor vehicle having a battery supported on a cantilevered tray within the vehicle's engine compartment wherein the vibrations otherwise experienced by the unsecured distal end of the tray is dampened by a substantially rigid bracket which engages the distal end of the tray, overlies the battery so as to retain it in the tray and also engages a vehicle body member. The damper-retaining bracket is preferably integral with an enclosure which encompasses the battery and shields the battery from engine compartment heat. The enclosure will preferably comprise hollow walls for also insulating the battery from such heat.

9 Claims, 3 Drawing Sheets

VEHICULAR BATTERY RETAINER AND SHIELD

This invention relates to motor vehicles and more particularly to vehicles having an electric storage battery mounted in the engine compartment thereof.

BACKGROUND OF THE INVENTION

Motor vehicles utilizing internal combustion engines typically have an engine compartment defined by vehicle body members such as wheel-well sheet metal, chassis/frame members, fire walls, etc. It is likewise common to provide an electric storage battery in the engine compartment for providing starting, lighting and ignition functions to the vehicle. The lives of such batteries are shortened when the battery is subjected to excessive heat and/or high amplitude/low-frequency vibrations/oscillations. It has been proposed to shield the battery from engine compartment heat by placing it in an appropriate enclosure and the battery is preferably securely mounted in a tray which itself is substantially rigidly anchored to the body member defining the engine compartment such that the battery is subjected to substantially only those vibrations/oscillations which are experienced by the body member itself.

In some vehicle designs, the configuration of, and available space within, the engine compartment precludes the battery tray from being perfectly rigidly secured to the body member, as discussed above, and has necessitated the use of battery trays which are anchored at one end to the body member and which are cantilevered out from the body member so as to leave a substantially unsupported distal end projecting into the engine compartment. The distal end of such cantilevering trays is susceptible to vibration modes and oscillations which are different from that experienced by the end of the tray which is mounted to the body member. Attempts to rigidify the cantilevering tray and reduce the amplitude of the oscillations of the distal end thereof by means of underlying braces or buttresses have met with only limited success in that the distal ends of the trays often still experience untoward oscillations detrimental to the life of the batteries they carry.

It is an object of the present invention to provide a cantilevering battery tray and overlying damper and retaining means associated therewith for both retaining the battery in the tray and reducing the amplitude of the oscillations of the tray's distal end to thereby prolong the useful life of the battery. It is a further object of the present invention, to provide such a brace and retaining means integral with an enclosure surrounding the battery and shielding it from heat within the engine compartment. These and other objects and advantages of the present invention will become more readily apparent from the detailed description thereof which follows and which is given hereafter in conjunction with the several drawings in which:

BRIEF DESCRIPTION OF THE INVENTION

The present invention comprehends a motor vehicle including a body member which in part defines a compartment containing an engine and a starting, lighting and ignition battery for the vehicle wherein the battery is supported on a tray cantilevered from the body member and held thereon by an overlying bracket which also serves to reduced the amplitude of the oscillations (i.e., dampen the vibration) experienced by the distal end of the tray under driving conditions. More specifically, the battery is supported on a tray which has one end secured to the body member and cantilevers therefrom such that the other (i.e., unsecured) end is susceptible to vertical oscillations when the vehicle is in motion, which are different from the oscillations of the body member itself. A combined damper and retention bracket overlies the battery and comprises a rigid strap-like bracket having (1) a first end secured to the distal end of the tray, (2) a second end secured to the body member at a site above the site where the tray attaches to the body member, and (3) a retainer section intermediate the two ends of the strap which contiguously overlies the battery and holds the battery securely in the tray. Retainer means (e.g., bolts) are provided for securing the bracket to the tray in such a manner that the retainer section thereof presses and holds the battery firmly in the tray. The bracket will preferably include longitudinal rib(s) and/or flange(s) to rigidify or stiffen the strap against bending and will be secured to the body member at a site below the top of the battery but above where the tray attaches to the body member. In accordance with a most preferred embodiment of the present invention, the aforesaid damper and retaining strap is integral with an enclosure which covers and shields the battery from engine compartment heat and thereby facilitates removal and replacement of the strap and enclosure while, at the same time, precluding the possibility that only one or the other might be replaced after the vehicle/battery has been serviced. The shielding enclosure will preferably have walls which comprise two panels separated one from the other by an air gap which further serves to insulate the battery from engine compartment heat.

DETAILED DESCRIPTION OF SPECIFIC EMBODIMENTS OF THE INVENTION

The invention will better be understood when considered in the light of the following detailed description of certain specific embodiments thereof.

Figure 1:
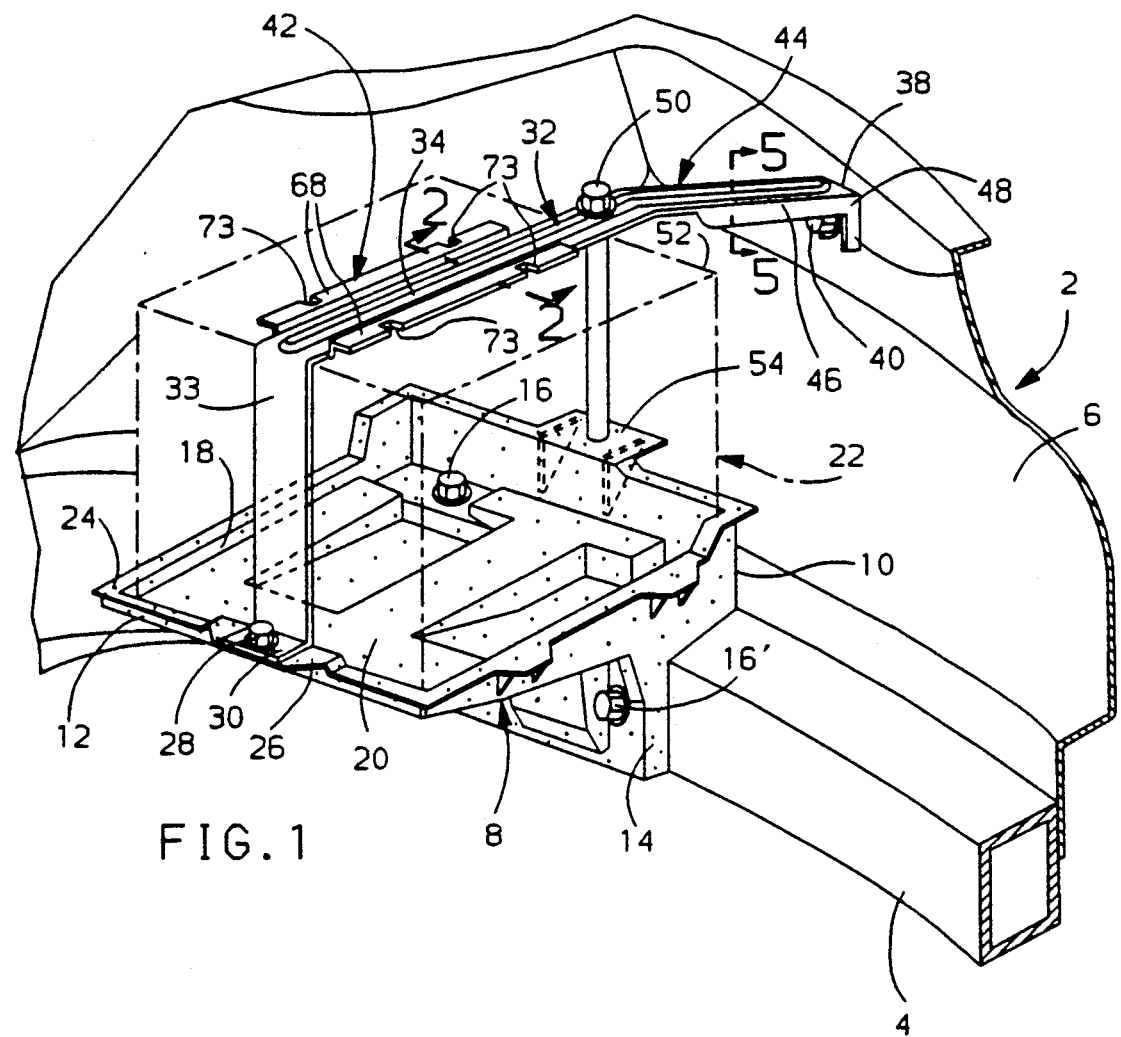
FIG. 1 is a perspective view of a vehicular engine compartment and battery retainer therein in accordance with the present invention.

FIG. 1 shows a body member 2 comprising a body rail 4 and sheet metal 6 (e.g., wheel-well) which in part defines a vehicle engine compartment. A battery tray 8, molded from glass-filled AZDEL~ plastic, has a mounting end 10 and a distal end 12 opposite the mounting end 10 and cantilevering out from the body member 2. An integral flange 14 depends from the underside of the tray 8 near the mounting end 10 for bracing the tray 8 and facilitating the mounting of the tray to the body rail portion 4 of the body member 2. Bolts 16 and 16' are used to anchor the tray 8 both vertically and horizontally to the rail 4. The tray 8 includes shallow walls 18 upstanding from a floor 20 to keep the battery 22 (shown in phantom) from shifting about in the tray. The upstanding walls 18 include horizontal flanges 24 which serve to add rigidity to the tray as well as provide an anchoring flange portion 26 for receiving bolt 28 for securing one end 30 of the damper-retention bracket 32 to the distal end of the tray 8.

The damper/retention bracket 32 is designed to be very rigid and resistant to bending in order to function as an adequate damper for the distal end of the tray, and to this end, will preferably include a longitudinal strengthening rib 34 formed therein. The bracket 32 has its distal end 30 secured to the tray 8 by bolt 28 and the other end 38 secured to the body member 2 by bolt 40. The bracket 32 includes a retainer portion 42 which overlies and presses down on the top of the battery 22 to hold the battery 22 in the tray 8. The bracket 32 also includes an arm portion 44 which extends from the inboard end (i.e., nearest the body member 2) of the retainer portion 42 to the body portion 2 so as to bridge the gap therebetween. The arm portion 44 includes flanges 46 depending normal to the principle plane of the arm (i.e., the rib-bearing portion) for rigidifying the arm 44 against bending especially at the elbow 48 where the bracket is bolted to the body member 2. A bolt 50 extends through the bracket 32 adjacent the inboard end 52 of the battery 22 and engages a flange 54 on the mounting end 10 of the tray 8 for pulling the retainer section 34 of the bracket 32 down tightly against the top of the battery 22 and thereby holding the battery firmly in the tray 8. Coupling the end 30 of the rigid bracket 32 to the distal end 12 of the tray 8 and the other end 38 to the body member 2 serves to substantially reduce the amplitude of the oscillations that the distal end 32 of the tray 8 would otherwise experience in service and thereby reduce the potentially damaging oscillations experienced by the battery. Tests have shown that the frequency of the oscillations of the distal end 12 of the tray 8 can be increased from about 19 Hertz to about 32 Hertz with a corresponding dampening effect corresponding to a significant reduction in the amplitude of the oscillations experienced by the distal end 12 of the tray 8.

Figure 2:
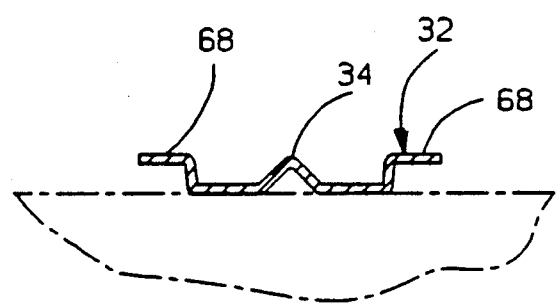
FIG. 2 is a sectioned view taken in the direction 2—2 of FIG. 1.
Figure 3:
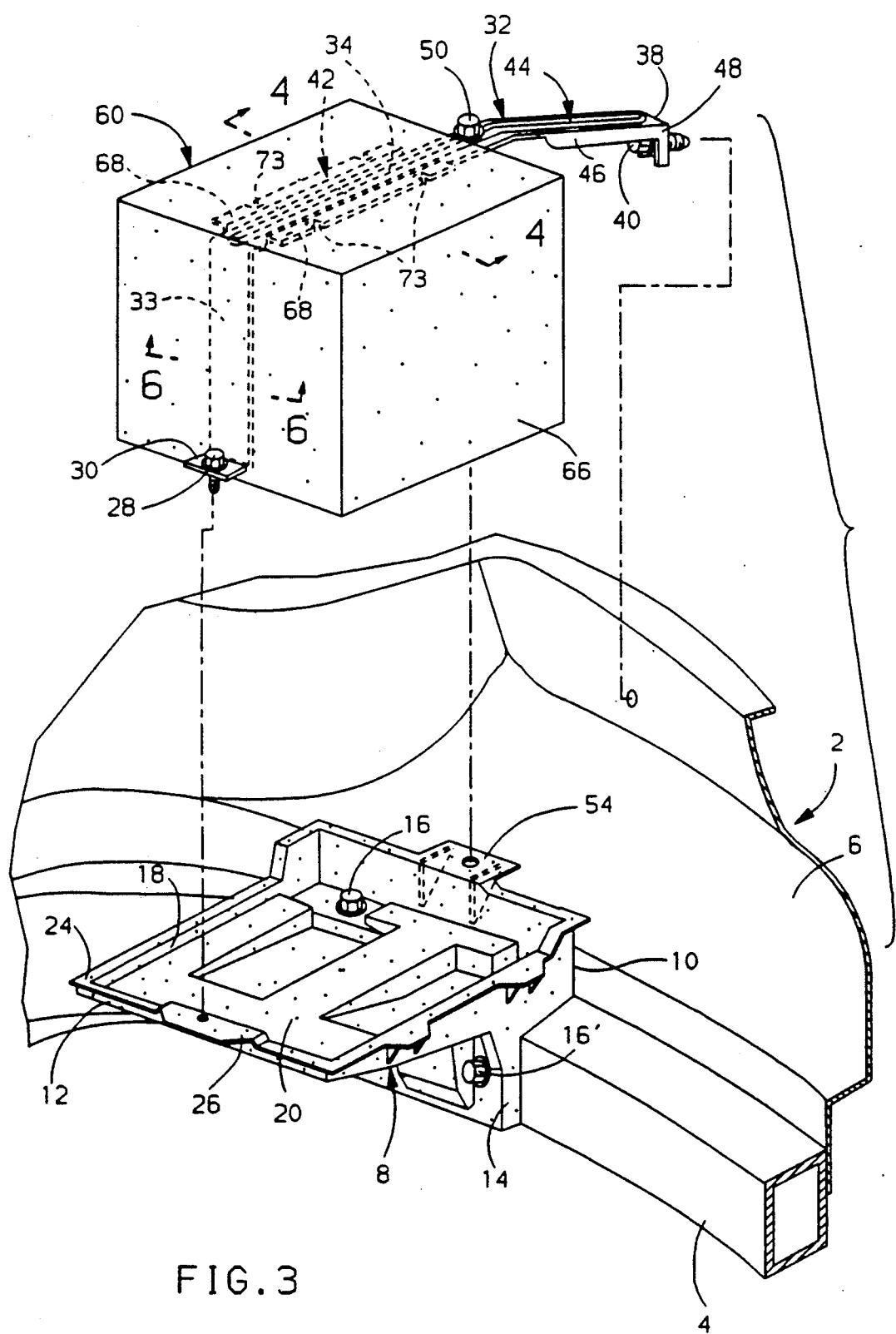
FIG. 3 is an exploded perspective view of another embodiment of the present invention.
Figure 4:
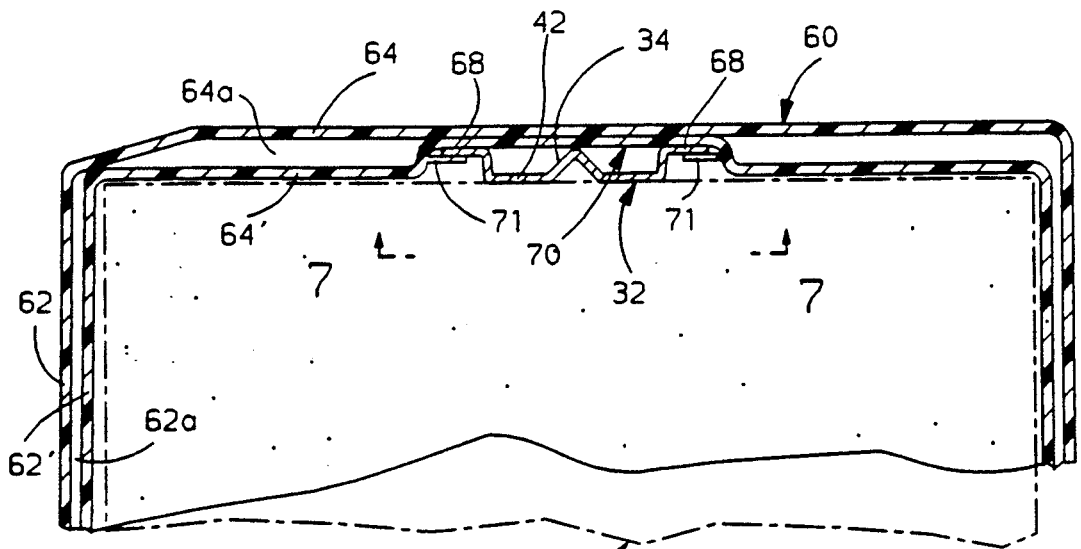
FIG. 4 is a sectioned view taken in the direction 4—4 of FIG. 3.
Figure 5:
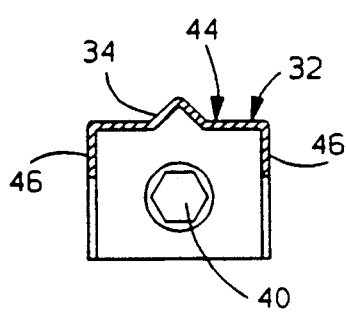
FIG. 5 is a sectioned view taken in the direction 5—5 of FIG. 1.
Figure 6:
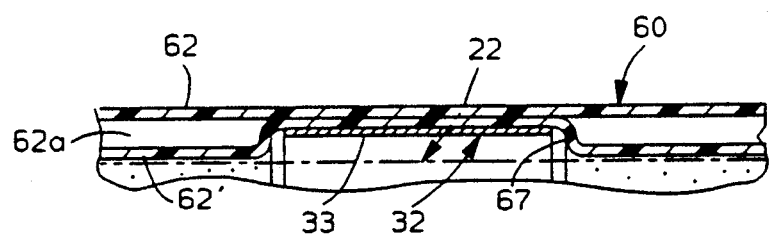
FIG. 6 is a sectioned view taken in the direction 6—6 of FIG. 3.
Figure 7:
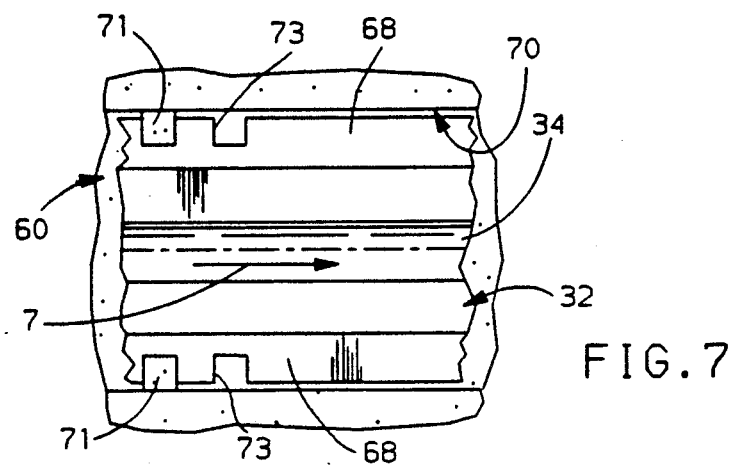
FIG. 7 is a view taken in the direction 7—7 of FIG. 4.

In accordance with the preferred embodiment of the present invention and as best shown in FIGS. 3, 4, 6 and 7, the rigid bracket 32 will be integral with an enclosure 60 which shields the battery 22 from engine compartment heat. The enclosure 60 will preferably comprise walls formed from a pair of opposed glass-filled polypropylene panels 62-62', which are spaced apart sufficiently to provide insulative air gap 62a therebetween. The air gap 62a serve to decrease the thermal conductivity of the enclosure's walls and thereby insulate the battery 22 from the engine compartment heat. The bracket 32 is conveniently made integral with the upper wall 64-64' by attaching the wing-like extensions 68 (see FIG. 2) on the retainer section 34 of strap 32 to the upper wall 64-64' by any convenient means, e.g., adhesives, rivets, etc.. Preferably, however, a channel 70 is provided in the inner panel of upper wall 64-64' (see FIG. 4) for receiving the retention section 34 of bracket 32. The channel 70 includes a plurality of inwardly projecting tabs 71 molded into the channel which engage the extensions 68 and wedge it in the channel 70. More specifically, the extensions 68 are provided with notches 73 for permitting the tabs 71 to pass therethrough during assembly. After the tabs 71 have passed through the notches 73 the retainer section 42 is slid in the direction shown by the arrow in FIG. 7 to secure the bracket 32 to the enclosure 60. As shown in FIG. 6, the depending leg 33 of the bracket 32 mates loosely (i.e., is not attached to) with a channel 67 on the inside of the wall 62' of the enclosure wall adjacent the distal end 12 of the tray 8.

While the invention has been disclosed primarily in terms of specific embodiments thereof it is not intended to be limited thereto but rather only to the extent set forth hereafter in the claims which follows.

The embodiments of the invention in which an exclusive property or privilege is claimed are defined as follows:

1. In a motor vehicle including a body member in part defining an engine compartment and a tray secured to, and cantilevered from, said body member for supporting an electric storage battery in said compartment wherein said tray has a mounting end engaging said body member at a first site and a distal end opposite said mounting end which is susceptible to vertical oscillations different from said body member when the vehicle is in motion, the improvement comprising a combined damper and retention means overlying said battery for reducing the amplitude of said distal end's oscillations and for retaining said battery in said tray, said damper and retention means comprising a rigid bracket having a first end secured to said distal end of said tray, a second end rigidly secured to said body member at a second site above said first site and a retainer section intermediate said first and second ends, said retainer section being rigidly coupled to said second end such as to suppress vertical movement of said first end of said bracket relative to said second end and contiguously overlying said battery for holding said battery securely in said tray, and means for securing said retainer section to said tray so as to compress said battery between said tray and said section.

2. The vehicle according to claim 1 wherein said second site is below the top of the battery.

3. The vehicle according to claim 2 wherein said strap includes a substantially rigid arm intermediate said retainer section and said second end for bridging the distance between said retainer section and said body member.

4. The vehicle according to claim 2 wherein said retainer section includes a rigidifying rib extending substantially the length of said section.

5. The vehicle according to claim 2 wherein said retainer section includes a pair of upstanding flanges extending along its longitudinal edges.

6. The vehicle according to claim 5 wherein said flanges each include a wing-like extension projecting laterally from said flange in a plane lying substantially parallel to the principle plane of said retainer section.

7. The vehicle according to claim 2 wherein said arm includes a pair of rigidifying flanges extending substantially normal to the principle plane of said arm along the longitudinal edges of said arm for stiffening said strap against bending.

8. In a motor vehicle including a body member in part defining an engine compartment and a tray secured to, and cantilevered from, said body member for supporting an electric storage battery in said compartment wherein said tray has a mounting end engaging said body member at a first site and a distal end opposite said mounting end which is susceptible to vertical oscillations when the vehicle is in motion, the improvement comprising a combined damper, retention and shield means overlying said battery for reducing the amplitude of said distal end's oscillations, for anchoring said battery in said tray and for shielding the battery from heat in said compartment, said damper, retention and shield means comprising a rigid bracket having a first end secured to said distal end of said tray, a second end rigidly secured to said body member at a second site above said first location such as to suppress vertical movement of said first end of said bracket relative to said second end and a retainer section intermediate said first and second ends and contiguously overlying said battery for holding said battery securely in said tray, means for securing said anchoring section to said tray so as to compress said battery between said tray and said section, and enclosure means integral with said bracket for shielding said battery from heat in said engine compartment and adapted for concurrently removal and replacement along with said bracket when servicing said battery or vehicle, said enclosure means comprising a plurality of walls surrounding said battery.

9. The vehicle according to claim 8 wherein said walls each comprise a pair of opposed panels separated one from the other so as to provide an insulative air space therebetween to insulate the battery encompassed thereby from engine compartment heat.

* * * * *